(12) United States Patent
Sun et al.

(10) Patent No.: US 9,195,682 B2
(45) Date of Patent: Nov. 24, 2015

(54) INTEGRATED ANALYTICS ON MULTIPLE SYSTEMS

(71) Applicants: Qi Sun, Shanghai (CN); Yun Jin, Shanghai (CN); Wen-Syan Li, Fremont, CA (US)

(72) Inventors: Qi Sun, Shanghai (CN); Yun Jin, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 259 days.

(21) Appl. No.: 13/668,555

(22) Filed: Nov. 5, 2012

(65) Prior Publication Data

US 2014/0089331 A1    Mar. 27, 2014

(30) Foreign Application Priority Data

Sep. 26, 2012   (CN) .......................... 2012 1 0363631

(51) Int. Cl.
*G06F 7/00* (2006.01)
*G06F 17/30* (2006.01)

(52) U.S. Cl.
CPC .... *G06F 17/30283* (2013.01); *G06F 17/30557* (2013.01)

(58) Field of Classification Search
CPC ................... G06F 17/30283; G06F 17/30286; G06F 17/30224; G06F 17/30539
USPC ............ 707/722, 802, 752; 718/100; 711/162
See application file for complete search history.

(56) References Cited

U.S. PATENT DOCUMENTS

| | | | |
|---|---|---|---|
| 7,590,620 B1* | 9/2009 | Pike et al. | |
| 2012/0124100 A1* | 5/2012 | Schabenberger et al. | 707/802 |
| 2013/0152088 A1* | 6/2013 | Gkantsidis et al. | 718/100 |
| 2013/0290300 A1* | 10/2013 | Chen et al. | 707/722 |
| 2013/0311454 A1* | 11/2013 | Ezzat | 707/722 |
| 2014/0040575 A1* | 2/2014 | Horn | 711/162 |

OTHER PUBLICATIONS

Timothy Prickett Morgan; Oracle tucks R stats language into databases; Feb. 13, 2012; http://www.theregisterco.uk/2012/02/10/oracle_advanced_analytics; https://web.archive.org/web/20120213045211/http://www.theregisterco.uk/2012/02/10/oracle_advanced_analytics.*

Revolution Analytics white paper; Advanced 'Big Data' Analytics with R and Hadoop; 2011; http://www.revolutionanalytics.com/sites/default/files/r-and-hadoop-big-data-analytics.pdf.*

* cited by examiner

*Primary Examiner* — James Trujillo
*Assistant Examiner* — John J Morris
(74) *Attorney, Agent, or Firm* — Brake Hughes Bellermann LLP

(57) ABSTRACT

The embodiments provide a federated system for supporting an application to perform analytics. The federated system includes a first distributed system for performing one or more first tasks including processing incoming data into a set of data blocks, an in-memory database system for performing one or more second tasks including receiving the set of data blocks from the first distributed system and storing the set of data blocks in an internal storage, and a second distributed system for performing one or more third tasks including receiving at least one data block of the set from the in-memory database system and performing analytics on the at least one data block. Execution of the first, second, and third tasks are controlled via a scripting language utilized by the application and associated with the in-memory database system.

18 Claims, 13 Drawing Sheets

```
1 /** A New Map task. */
2 publicclassMemoryMapTaskextends Task {
3 /**
4  * .......
5  * omit other helper methods
6  * ................
7  */
8
9 /**
10  * Override the method to run the map function and send the results
11  * to local result collector daemon.
12  */
13 @Override
14 publicvoid run(finalJobConf job, finalTaskUmbilicalProtocol umbilical)
15 throwsIOException, ClassNotFoundException, InterruptedException {
16 // ....
17 // some initial steps.
18 // ....
19
20 // make a task context so we can get the classes
21 org.apache.hadoop.mapreduce.TaskAttemptContexttaskContext =
22 neworg.apache.hadoop.mapreduce.TaskAttemptContext(job, getTaskID());
23 // make a mapper
24    org.apache.hadoop.mapreduce.Mapper<INKEY,INVALUE,OUTKEY,OUTVALUE> mapper =
25       (org.apache.hadoop.mapreduce.Mapper<INKEY,INVALUE,OUTKEY,OUTVALUE>)
26 ReflectionUtils.newInstance(taskContext.getMapperClass(), job);
27 // make the input format
28 org.apache.hadoop.mapreduce.InputFormat<INKEY,INVALUE>inputFormat =
29       (org.apache.hadoop.mapreduce.InputFormat<INKEY,INVALUE>)
30 ReflectionUtils.newInstance(taskContext.getInputFormatClass(), job);
31
32 // rebuild the input split
33 // (The split is a logical split of the inputs and the input files are not
34 // physically split into chunks.)
35 org.apache.hadoop.mapreduce.InputSplit split = null;
36    split = getSplitDetails(new Path(splitIndex.getSplitLocation()),
37 splitIndex.getStartOffset());
38
39 org.apache.hadoop.mapreduce.RecordReader<INKEY,INVALUE> input =
40 newNewTrackingRecordReader<INKEY,INVALUE>
41       (split, inputFormat, reporter, job, taskContext);
42
```

310 — lines 1–2
315 — lines 16–31
320 — lines 32–42

FIG. 3A

```
43 job.setBoolean("mapred.skip.on", isSkipping());
44 org.apache.hadoop.mapreduce.RecordWriter output = null;
45   org.apache.hadoop.mapreduce.Mapper<INKEY,INVALUE,OUTKEY,OUTVALUE>.Context
46 mapperContext = null;
47 try {
48      Constructor<org.apache.hadoop.mapreduce.Mapper.Context>contextConstructor =
49 org.apache.hadoop.mapreduce.Mapper.Context.class.getConstructor
50      (new Class[]{org.apache.hadoop.mapreduce.Mapper.class,
51 Configuration.class,
52 org.apache.hadoop.mapreduce.TaskAttemptID.class,
53 org.apache.hadoop.mapreduce.RecordReader.class,
54 org.apache.hadoop.mapreduce.RecordWriter.class,
55 org.apache.hadoop.mapreduce.OutputCommitter.class,
56 org.apache.hadoop.mapreduce.StatusReporter.class,
57 org.apache.hadoop.mapreduce.InputSplit.class});
58
59 // Get an output object.
60 // The MapMemoryOutputCollector will collect the results in map phase.
61 // When the map task is done, MapMemoryOutputCollector.close() should be called,
62 // so that the collected result could be sent to the daemon in the same node.
63      output = newMapMemoryOutputCollector(taskContext, job, umbilical, reporter, this, splitIndex);
64 // Initialize and run the mapper.
65 mapperContext = contextConstructor.newInstance(mapper, job, getTaskID(),
                                input, output, committer,
                                reporter, split);
66 input.initialize(split, mapperContext);
67 mapper.run(mapperContext);
68 input.close();
69 // Once close method is called, the results would be sent to local daemon.
70 output.close(mapperContext);
71    } catch (NoSuchMethodException e) {
72 thrownewIOException("Can't find Context constructor", e);
73    } catch (InstantiationException e) {
74 thrownewIOException("Can't create Context", e);
75    } catch (InvocationTargetException e) {
76 thrownewIOException("Can't invoke Context constructor", e);
77    } catch (IllegalAccessException e) {
78 thrownewIOException("Can't invoke Context constructor", e);
79    }
80 }
```

325 — lines 43–63
330 — lines 65–70

FIG. 3B

```
1// This output collector would send the result of one map task to the local
2// daemon.
3 publicclassMapMemoryOutputCollector {
4 privateArrayList columns = null;
5 privateint counter = 0;
6// The index indicating where the result should be put in the final output.
7 privatelongsplitIndex = -1;

8 private Socket socket = null;
9 OutputStream out = null;
10 BufferedOutputStream bout = null;

11 @SuppressWarnings("unchecked")
12 MapMemoryOutputCollector(org.apache.hadoop.mapreduce.JobContextjobContext,
JobConf job,
TaskUmbilicalProtocol umbilical,
TaskReporter reporter,
        Task mapTask,
longsplitIndex) throwsIOException, ClassNotFoundException {
13    columns = newArrayList();
14 this.splitIndex = splitIndex;

15// Establish socket connection with local daemon.
16    socket = new Socket("localhost", 40110);
17    out = socket.getOutputStream();
18    bout = newBufferedOutputStream(out);
19 }
```
405

```
20 publicvoid write(Object data) throwsIOException {
21 columns.add(data);
22// .......
23// More custom logic could be added here.
24// ......
25// Increase the counter to indicate how many data items are added.
26        ++counter;
27 }
```
410

```
28 privatevoid flush() throwsIOException {
29      if (counter == 0){
30            out.flush();
31            return;
32      }
33
34// Write the total number of data items in begining of the buffer.
35      byte[] numBytes = BytesConstructor.convertFromInt(counter);
36      bout.write(numBytes);

37// Write the data index in the second place to indicat where to insert
38// these results in the final output.
39 byte[] dataIndexBytes = BytesConstructor.convertFromInt(splitIndex);
40 bout.write(splitIndex);

41// Write the data.
42      byte[] resultBytes = BytesConstructor.convertFromArray(columns);
43      bout.write(resultBytes);
44 }
```
415

```
45 publicvoid close() throwsIOException,InterruptedException {
46// flush the data before closing the socket.
47        flush();
48// close the local socket.
49        out.close();

50// Clear buffers in this map task process.
51        counter = 0;
52        columns.clear();
53 }
54 }
```
420

FIG. 4

```
1 // Memory map result collect daemon.
2 publicclassMemoryMapResultCollectDaemon {
3        privatestatic List<byte[]>dataBuffer = null;
4
5// Thread to send all the data reveiced in this daemon.
6        private Thread sendThread = null;
7
8// The socket for reveiving coming data.
9        ServerSocketsrvSocket = null;
10// The specified socket port.
11       staticintsrvPort = 40110;
12// The socket to send received data.
13// By default, it directly sends the data to HANA server, but could be
14// configured to send the data to another daemon. Thus, the data flow
15// hierarchy is established.
16       Socket sendSocket = null;
17// default next stop server host
18       static String nextStopHost = "hanahost";
19// default next stop server port
20       staticintnextStopPort = 3333;
21       // The only instance for the daemon instance.
22       privatestaticMemoryMapResultCollectDaemon daemon = null;
23       privateMemoryMapResultCollectDaemon(){
24             init();
25       }
26// Initialize the daemon.
27       privatevoidinit(){
28             try {
29                    dataBuffer = newLinkedList<byte[]>();
30
31                    // Set up the sockets.
32                    srvSocket = newServerSocket(srvPort);
33                    sendSocket = new Socket(nextStopHost, nextStopPort);
34
35// start the send thread.
36                    sendThread = new Thread(newDataSender(sendSocket));
37             } catch (IOException e) {
38                    // TODO Auto-generated catch block
39                    e.printStackTrace();
40             }
41       }
42
43       publicstaticMemoryMapResultCollectDaemongetDaemon(){
44             if(daemon == null)
45                    daemon = newMemoryMapResultCollectDaemon();
46             return daemon;
47       }
48
```

```
49// Get the data from the buffer and send to next stop daemon.
50      publicstatic List<byte[]>getData(){
51              List<byte[]> result = null;
52              try{
53                      synchronized(dataBuffer){
54                              while(dataBuffer.size() == 0){
55 System.out.println("MemoryMapResultCollectDaemon: Data sender is waiting for sending data."
56                                      dataBuffer.wait();
57                              }
58
59                              result = newLinkedList<byte[]>();
60                              for(byte[] cur : dataBuffer){
61                                      result.add(cur);
62                              }
63
64                              dataBuffer.clear();
65                      }
66              }catch (InterruptedException e) {
67                      e.printStackTrace();
68              }
69
70              return result;
71      }
72
73// Store data in this daemon buffer and notify data sender to send data to next daemon.
74      publicstaticvoidputData(byte[] bytes){
75              synchronized(dataBuffer){
76                      dataBuffer.add(bytes);
77 System.out.println("MemoryMapResultCollectDaemon: Notify data sender thread...");
78                      dataBuffer.notify();
79              }
80      }

81// Start the daemon.
82      publicvoid start() {
83              System.out.println("MemoryMapResultCollectDaemon: Starting...");
84              try {
85                      sendThread.start();
86                      controllerThread.start();
87              System.out.println("MemoryMapResultCollectDaemon: Listening at "+ srvPort + "...");
88                      while (true) {
89// Listen on the socket to wait for connection.
90                              Socket client = srvSocket.accept();
91
92//              }
92// Start a new thread to receive data.
93                              DataReceiver receiver = newDataReceiver(client);
94                              Thread receiveThread = new Thread(receiver);
95
96                              receiveThread.start();
97                      }
98              } catch (IOException e) {
99                      e.printStackTrace();
100             }
101     }
```

515 — lines 50–71
520 — lines 74–80
525 — lines 82–101

FIG. 5B

```
102
103      publicstaticvoid main(String[] args) {
104           if(args.length == 2){
105                hanaIp = args[0];
106                try{
107                     hanaSocketPort = Integer.parseInt(args[1]);
108                }catch(NumberFormatException e){
109 System.out.println("MemoryMapResultCollectDaemon: Wrong port, the default port is 3333.");
110                }
111           }
112 MemoryMapResultCollectDaemon daemon = MemoryMapResultCollectDaemon.getDaemon();
113           daemon.start();
114      }
115}

116 publicclassDataReceiverimplements Runnable {
117      private Socket socket;

118      publicDataReceiver(Socket client) {
119           this.socket = client;
120      }

121      publicvoid run() {
122           try {
123                InputStream in = socket.getInputStream();
124                BufferedInputStreambufIn = newBufferedInputStream(in);
125
127intintLength = 4;
128intlongLength = 8;
129                // Read the first 4 bytes, encoded for the data block size.
130                byte[] lenBytes = newbyte[intLength];
131                bufIn.read(lenBytes);
132
133// Read the next 8 bytes for split order number.
134byte[] splitIndexBytes = newbyte[longLength];
135                bufIn.read(splitIndexBytes);
136
137                byte[] dataBytes = newbyte[intLength + longLength + dataSize];
138bufIn.read(dataBytes);

139                // Copy the lenBytes to dataBytes
140                System.arraycopy(lenBytes, 0, dataBytes, 0, lenBytes.length);
```

FIG. 5C

```
141// Copy the splitIndexBytes to dataBytes
142 System.arraycopy(splitIndexBytes, intLength, dataBytes, 0, intLength.length);

143// Write data to the local data buffer.
144                 MemoryMapResultCollectDaemon.putData(dataBytes);

145// Close the socket.
146                 socket.close();
147             } catch (Exception e) {
148                 e.printStackTrace();
149             }
150     }
151 }

152 // Data sender thread.
153 publicclassDataSenderimplements Runnable{
154     private Socket socket;
155     privateOutputStream out;
156     privateBufferedOutputStreambufout;
157
158
159     publicDataSender(Socket hanaSocket) throwsIOException{
160         this.socket = hanaSocket;
161         out = socket.getOutputStream();
162         bufout = newBufferedOutputStream(out);
163     }
164     publicvoid run(){
165         try{
166             while (true){
167                 // The thread would be blocked if no data to get.
168         List<byte[]>dataPackages = MemoryMapResultCollectDaemon.getData();
169                 for (byte[] data : dataPackages){
170                     bufout.write(data);
171                 }
172                 bufout.flush();
173             }
174         }catch (Exception e) {
175             e.printStackTrace();
176         }
177
178 socket.close();
179     }
180 }
```

FIG. 5D

```
1  /* The thread that receive data from Hadoop. */
2  TrexThreads::ThreadErrorDataReceiveThread::run(void* theData) {
3
4       BFLHRH *hrh = (BFLHRH*)theData;
5
6       /* Determine the size of data to receive. */
7       unsignedintdataSize = m_numOfRow * hrh->m_numOfColumn * hrh->m_columnTypeSize;
8
9       /* Receive the data and store them to a buffer. */
10      char *revbuff = newchar[dataSize];
11      recvToFull(m_receiveSock, revbuff, dataSize);
12
13      /* Convert byte stream to unsigned int stream.*/
14      unsignedint *databuff = (unsignedint*)(revbuff);
15      ntohlForArray(databuff, m_numOfRow*hrh->m_numOfColumn);
16
17      /* Get the columns of the result table. */
18      ColumnBase *cols[hrh->m_numOfColumn];
19      for(inti=0; i<hrh->m_numOfColumn; i++)
20      {
21              cols[i] = hrh->m_result->getColumn(i);
22      }
23
24      /* Store data to those columns. */
25      for(inti=0; i<m_numOfRow; i++)
26      {
27              for(int j=0; j<hrh->m_numOfColumn; j++)
28              {
29                      cols[j]->set(i, databuff[i+j*m_numOfRow]);
30              }
31      }
32
33      deleterevbuff;
34      close(m_receiveSock);
35
36      TrexThreads::A_OK;
37 }
```

602 — lines 6–15
610 — lines 17–22
615 — lines 25–31

FIG. 6

```
1 /* Create the type of the result table. */
2 DROPTYPE T_RESULTS_TAB;
3 CREATETYPE T_RESULTS_TAB ASTABLE("ROWID"INTEGER, "A"INTEGER, "B"INTEGER, "C"INTEGER,"D"
4 INTEGER) ;
```
*(705)*

```
5 /* Create the procedure which calls function hrh. In BFL function hrh, first it starts a service
to receive data from Hadoop nodes, then it triggers Hadoop to do mapping jobs, after
receiving data it stores them to an internal table which will be returned as the result table. */
6 DROPPROCEDURE BFLHRH;
7 CREATEPROCEDURE BFLHRH(OUT results T_RESULTS_TAB )
8 LANGUAGE LLANG
9 AS
10 BEGIN
11 export Void main(
12 Table< Int32 "ROWID", Int32 "A", Int32 "B", Int32 "C", Int32 "D">"results"&resultsTab)
13 {
14 bfl::hrh(resultsTab);
15 }
16 END ;
```
*(710)*

```
17 /* Create a table to store the result. */
18 DROPTABLE RESULTS_TAB;
19 CREATECOLUMNTABLE RESULTS_TAB ("ROWID"INTEGER, "A"INTEGER, "B"INTEGER, "C"INTEGER, "D"INTEGER);
```
*(715)*

```
20 /* Call procedure BFLHRH. The result will be stored in "RESULTS_TAB". */
21 CALL BFLHRH(RESULTS_TAB) WITH OVERVIEW;
```
*(720)*

FIG. 7

INTEGRATED ANALYTICS ON MULTIPLE SYSTEMS

BACKGROUND

Designing a successful analytics product involves the consideration of a number of various factors including performance (e.g., response time), total cost of ownership, and/or availability of existing packages. Currently, there exists a number of different systems to support analytics such as distributed file systems (e.g., Hadoop systems), distributed systems that support an open source programming language (e.g., R systems), and systems that support in-memory technology. For example, the Hadoop system may be a system supporting massive parallelism with a relatively low cost of ownership, but may include limitations of shared nothing architecture, relatively lower performance compared with many modern in-memory analytics applications and a lack of query languages. The R system may be a statistical computing package with more than 3000 available packages, but with limited scalability in term of parallelism and handling large data set as well as lower performance since it is a disk-based system. The in-memory system may have the highest performance in term of response time. Also, the in-memory system may fully utilize multi-core infrastructure to ensure full parallelism of complex analytics, and may provide a flexible query language for database queries as well as capability to include non-SQL stored procedures of any kind, such as C/C++, R, and binary code that may invoke external systems. However, in-memory database systems are, in general, more expensive than other systems and have less new application/analytical packages available.

As such, these analytic systems have their own advantages and disadvantages. Generally, customers demand a system that has high performance with affordable prices. Building an analytics system using one of the above described systems restricts the system to the limitations of the underlying technology. For example, the Hadoop system has a lower cost of ownership but lacks of the high performance and language capability of the in-memory system, whereas building the system using in-memory system may not be cost-effective for processing large sets of raw data. Also, the R system may lack the capacity of processing large sets of raw data as well as the scalability/parallelism for high performance.

SUMMARY

The embodiments provide a federated system for supporting an application to perform analytics. The federated system includes a first distributed system for performing one or more first tasks including processing incoming data into a set of data blocks, an in-memory database system for performing one or more second tasks including receiving the set of data blocks from the first distributed system and storing the set of data blocks in an internal storage, and a second distributed system for performing one or more third tasks including receiving at least one data block of the set from the in-memory database system and performing analytics on the at least one data block. Execution of the first, second, and third tasks are controlled via a scripting language utilized by the application and associated with the in-memory database system. The one or more third tasks includes receiving results of the analytics from the second distributed system and storing the results in the internal storage.

The first distributed system may include a Hadoop system, and the second distributed system may include an R system. The scripting language may include a Structured Query Language (SQL) script, where the SQL script may include embedded R language script.

The in-memory database system may be configured to receive the set of data blocks from the first distributed system via a memory-to-memory copy channel. The first distributed system may include a plurality of nodes, and each node may include a converting unit configured to convert the incoming data into one or more data blocks having a format compatible with the internal storage of the in-memory database system.

The in-memory database system may include a sorting unit configured to sort the set of data blocks such that a data block of the set is not made available for analytics until previous data blocks of the set are received. The first distribution system may include a sorting unit configured to sort the set of data blocks before transmitting the set of data blocks to the in-memory database system.

The scripting language associated with in-memory database system may include one or more commands having a scripting language associated with the second distribution system, where the in-memory database system may transmit the one or more commands along with the at least one data block to the second distribution system for performing the analytics.

The second distributed system receiving the at least one data block from the in-memory database system may include receiving the one or more commands and the at least one data block via a memory-to-memory copy channel. The in-memory database system may receive the results of the analytics via the memory-to-memory copy channel.

The federated system may further include a data transmitter configured to receive the set of data blocks from the first distributed system, determine whether the set of data blocks reaches a threshold level, and transmit the set of data blocks if the set of data blocks is determined as reaching the threshold level. The federated system may further include a data transfer coordinator configured to control transfer of the set of data blocks from the first distributed system to the in-memory database system.

The embodiments also provide a method for supporting an application to perform analytics. The method includes performing, including a first distributed system, one or more first tasks including processing incoming data into a set of data blocks, performing, including an in-memory database system, one or more second tasks including receiving the set of data blocks from the first distributed system and storing the set of data blocks in an internal storage, and performing, including a second distributed system, one or more third tasks including receiving at least one data block of the set from the in-memory database system and performing analytics on the at least one data block. Execution of the first, second, and third tasks are controlled via a scripting language utilized by the application and associated with the in-memory database system, and the one or more third tasks includes receiving results of the analytics from the second distributed system and storing the results in the internal storage.

The receiving the set of data blocks from the first distributed system may include receiving the set of data blocks from the first distributed system via a memory-to-memory copy channel. The one or more first tasks may further include converting the incoming data into one or more data blocks having a format compatible with the internal storage of the in-memory database system.

The one or more second tasks may include sorting the set of data blocks such that a data block of the set is not made available for analytics until previous data blocks of the set are received. The one or more first tasks may include sorting the set of data blocks before transmitting the set of data blocks to the in-memory database system The scripting language associated with in-memory database system may include one or more commands having a scripting language associated with the second distribution system, where the one or more second tasks may include transmitting the one or more commands along with the at least one data block to the second distribution system for performing the analytics. The one or more third tasks may include receiving the one or more commands and the at least one data block via a memory-to-memory copy channel.

The embodiments also provide a computer program product tangibly embodied on a non-transitory computer-readable storage medium and including executable code that, when executed, is configured to cause a federated system to perform one or more first tasks including processing incoming data into a set of data blocks by a first distributed system, perform one or more second tasks including receiving the set of data blocks from the first distributed system and storing the set of data blocks in an internal storage of an in-memory database system, and perform one or more third tasks including receiving at least one data block of the set from the in-memory database system and performing analytics on the at least one data block by a second distributed system. Execution of the first, second, and third tasks are controlled via a scripting language utilized by the application and associated with the in-memory database system, and the one or more third tasks includes receiving results of the analytics from the second distributed system and storing the results in the internal storage.

The details of one or more implementations are set forth in the accompanying drawings and the description below. Other features will be apparent from the description and drawings, and from the claims.

BRIEF DESCRIPTION OF THE DRAWINGS

FIG. 3A illustrates a code implementation of a new map task performed by the first distributed system according to an embodiment;

FIG. 3B illustrates a continuation of the code implementation of the new map task performed by the first distributed system of FIG. 3A according to embodiment;

FIG. 4 illustrates a code implementation of a local daemon according to an embodiment;

FIG. 5A illustrates a code implementation for transferring data from the map task to the in-memory database system according to an embodiment;

FIG. 5B illustrates a continuation of the code implementation of FIG. 5A for transferring data from the map task to the in-memory database system according to an embodiment;

FIG. 5C illustrates a continuation of the code implementation of FIGS. 5A and 5B for transferring data from the map task to the in-memory database system according to an embodiment;

FIG. 5D illustrates a continuation of the code implementation of FIGS. 5A, 5B, and 5C for transferring data from the map task to the in-memory database system according to an embodiment;

FIG. 6 illustrates a code implementation for the in-memory database system to store received data blocks into an internal storage according to an embodiment; and FIG. 7 illustrates a code implementation of a sample SQL script to issue a federated query in the in-memory database system according to an embodiment.

DETAILED DESCRIPTION

The embodiments provide a federated system for performance of integrated analytics on multiple systems such as a first distributed system, an in-memory database system, and a second distributed system, for example. The federated system may support one or more applications for the performance of analytics, and may distribute the tasks of such applications across the multiple systems in a manner that utilizes the benefits of each system.

Figure 1A:
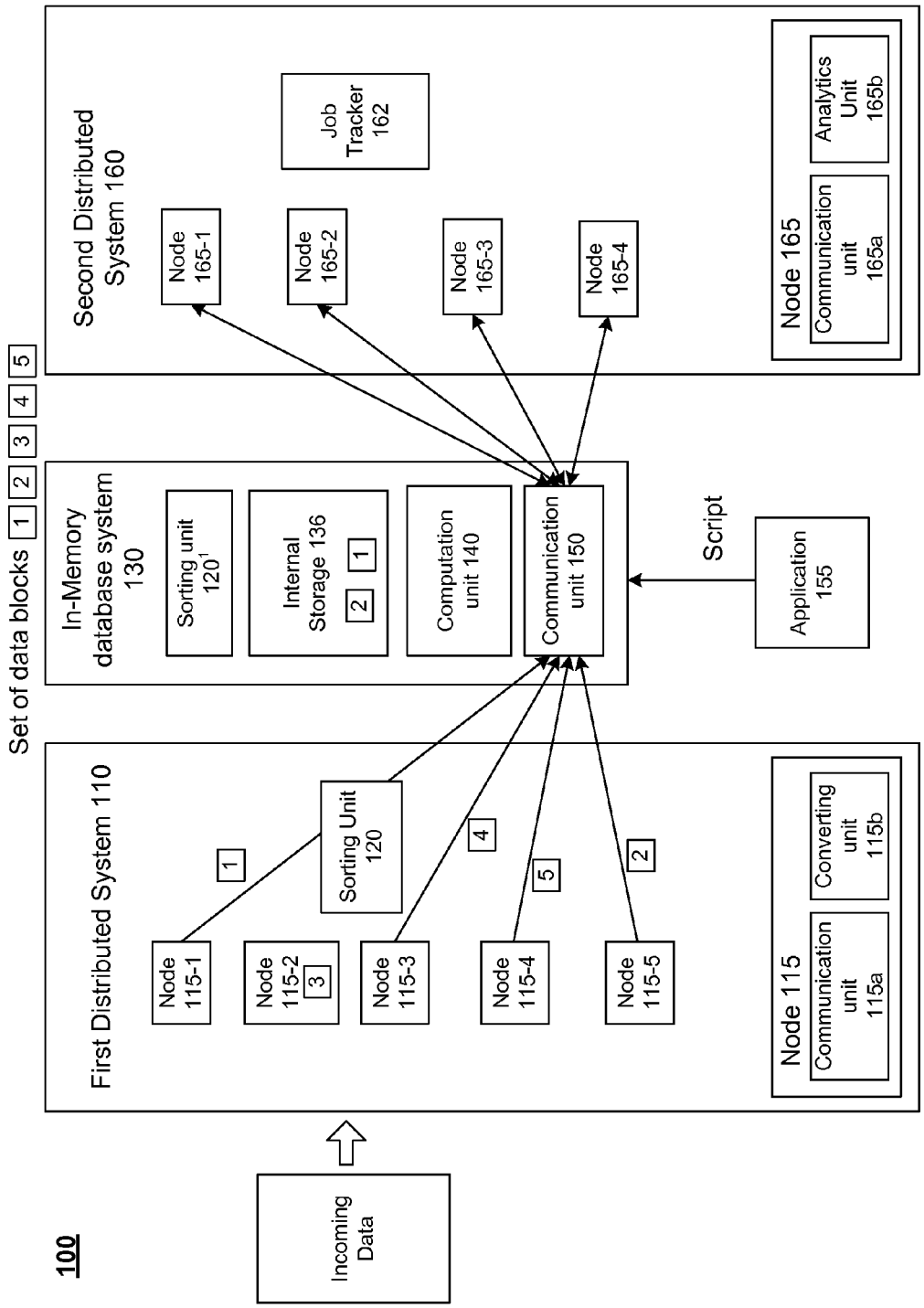
FIG. 1A illustrates a federated system for supporting an application to perform analytics according to an embodiment.

FIG. 1A illustrates a federated system 100 for supporting an application 155 to perform analytics according to an embodiment. The federated system 100 may include multiple systems such as a first distributed system 110, an in-memory database system 130, and a second distributed system 160. The application 155 may be any type of application that relies upon analytic calculations.

As further described below in greater detail, generally, the first distributed system 110 may process incoming data into a set of data blocks 116, and the data blocks 116 are transmitted to the in-memory database system 130 for storage and optionally computational-intensive calculations. In one embodiment, as shown in FIG. 1A, the set of data blocks 116 may be transmitted via a memory-to-memory copy channel between the first distributed system 110 and the in-memory database system 130. Other variations are further described in FIGS. 1B and 1C. The tasks being performed at the first distributed system 110 may be considered first tasks.

The in-memory database system 130 may perform one or more second tasks including receiving the set of data blocks 116 and storing the set of data blocks 116 in an internal storage 136 of the in-memory database system 130. However, the in-memory database system 130 may perform other second tasks such as any type of computational calculations. However, according to an embodiment, the performance of the analytics is pushed to the second distributed system 160. For example, the second distributed system 160 may perform one or more third tasks including receiving one or more data blocks 116, performing analytics on the received data blocks 116, and transferring the results of the analytics back to the in-memory database system 130 for storage. According to an embodiment, the execution of the first, second, and third tasks are controlled via a scripting language utilized by the application 155 and associated with the in-memory database system 130.

The scripting language may include a Structured Query Language (SQL) script. Basically, the application 155 may use the SQL script on the in-memory database system 110 as the main language. In other words, the application 155 uses the SQL script associated with the in-memory database system 130 as the language to federate the execution of all tasks including the first tasks, the second tasks, and the third tasks. With reference to the second distributed system 160, the SQL script may include embedded script associated with the second distributed system 160 such as an R script (if the second distributed system 160 includes the R system). As such, the embedded script may be pushed along with the one or more data blocks 116 from the in-memory database system 130 to the second distributed system 160 for performance of the analytics. The second distributed system 160 may perform one or more analytical calculations, and transmit the results of the analytics back to the in-memory database system 130. These and other features of the embodiments are further described below.

The first distributed system 110 may include a system that is distributed across of a plurality of nodes 115 that supports data collection capabilities including the collecting and processing of relatively large sets of incoming data. For example, the first distributed system 110 may include the capabilities of processing incoming data up to petabytes and beyond. In one embodiment, the first distributed system may include an open source framework that supports one or more data-intensive distributed applications, which may enable the application 155 to operate in conjunction with the plurality of nodes 115, which may be considered a node cluster. The plurality of nodes 115 may be computational independent computers/servers. For instance, each node 115 may represent a separate computational computer, or multiple nodes 115 may be associated with a particular computation computer. The embodiments encompass any number of nodes 115 associated with a particular computation computer including the capability of having the plurality of nodes 115 on a single computation computer. As such, each node 115 may be associated with software and hardware components such as one or more processors, and one or more non-transitory storage units including executable code, that when executed, cause the one or more processors to perform the functionalities described herein. In a particular embodiment, the first distributed system 110 may include a Hadoop system, which is a distributed file system known in the art. However, the Hadoop system has been modified, as discussed below, to include the functionalities of supporting the federated system 100. It is noted that beside the specific example of the Hadoop system, the embodiments encompass any type of distributed system that can handle relatively large sets of incoming data.

The first distributed system 110 may perform one or more first tasks including processing incoming data into a set of data blocks 116. For example, the processing of incoming data may be implemented and distributed across the node cluster, e.g., the plurality of nodes 115. In particular, each node 115 may process a portion of the incoming data, and formulate the processed incoming data as one or more data blocks 116. The example of FIG. 1A illustrates five nodes (e.g., a first node 115-1, a second node 115-2, a third node 115-3, a fourth node 115-4 and a fifth node 115-5) as part of the node cluster. However, the embodiments encompass any number of nodes 115 for a particular node cluster, as well as any number of data blocks 116.

According to the embodiments, as shown in FIG. 1A, each node 115 may include a communication unit 115a and a converting unit 115. The communication unit 115a may be configured to handle the communication between the first distributed system 110 and the in-memory database system 130 according to a unique communication protocol, which is explained in more detail with reference to FIGS. 3-7. In one embodiment, each communication unit 115a may transmit its respective data blocks 116 to the in-memory database system 130 via a memory-to-memory copy channel. For example, each communication unit 115a may execute a memory-to-memory copy instruction, where the transfer of the data blocks 116 is facilitated through a communication channel. The communication channel may be any type of wired or wireless communication channel known in the art. Other variations of the transmission of the data blocks 116 from the first distributed system 110 to the in-memory database system 130 are further illustrated in FIGS. 1B and 1C. The converting unit 115b may be configured to convert the incoming data into one or more data blocks 116 having a format compatible with the internal storage 136 of the in-memory database system 130. For example, the data blocks 116 to be sent may be converted into the format associated with the in-memory database system 130 such that the formatted data is ready to be consumed/stored by the internal storage 136.

Also, the federated system 100 may employ a sorting mechanism that sorts the set of data blocks 116. The sorting mechanism may be accomplished according to a number of different ways. In one example, the first distributed system 110 may include a sorting unit 120 that is configured to sort the set of data blocks 116 before transmitting the set of data blocks 116 to the in-memory database system 130. In this example, the sorting unit 120 may be located on a central server or one or more of the computational computers associated with the nodes 115, and may be configured to collect each data block 116 as it is processed by the individual node 115. Then, the sorting unit 120 may sort the set of data blocks 116 such that the data blocks 116 are in the appropriate order specified by the communication protocol including sorting the data blocks 116 such that they are in the correct temporal order (e.g., data block 1, data block 2, data block 3, data block 4 and data block 5, or in reverse order). Further, the sorting unit 120 may wait to transmit the set of data blocks 116 until the set reaches a threshold level. For example, the sorting unit 120 may determine whether the set of data blocks 116 reaches a threshold level (or some other criteria), and then transmit the set of data blocks 116 if the set of data blocks 116 is determined as reaching the threshold level (or meeting the specified criteria), which may be part of a larger data block.

In another example, the sorting mechanism may be accomplished at the in-memory database system 130. In this example, the in-memory data system 130 may include a sorting unit $120^1$ that is configured to sort the set of data blocks 116. In particular, instead of sorting the data blocks 116 at the first distributed system 110, the communication unit 115a transmits its data blocks 116 to the in-memory database system 130 as they are formed. For example, each node 115 may transmit a data block 116 once it is generated, and the sorting unit $120^1$ in the in-memory database system 130 is responsible for sorting the data blocks 116. The data blocks 116 are not made available until the sort function is carried out, e.g., when previous data blocks 116 are received. This example is illustrated in FIG. 1A. For example, referring to FIG. 1A, the first data block 116-1, the second data block 116-3, the fourth data block 116-4, and the fifth data block 116-5 have been transmitted by their respective nodes 115. However, the third data block 116-3 has yet to be transmitted to the in-memory database system 130. As such, the first data block 116-1 and the second data block 116-2 are available for performing analytics (or any other subsequent or parallel task), as illustrated by the fact that the first data block 116-1 and the second data block 116-2 are populated in the internal storage 136. However, because the third data block 116-3 is not yet received by the in-memory database system 130, the fourth data block 116-4 and the fifth data block 116-5 are not made available for use until the third data block 116-3 is received.

The in-memory database system 130 may be a type of database management system that relies on main memory for computer data storage. In contrast, conventional database systems employ a disk storage mechanism. Also, the in-memory database system 130 may support supports real-time analytics and transactional processing including replication and aggregation techniques. In one embodiment, the in-memory database system 130 may be HANA Enterprise 1.0 (any other versions) that is developed by SAP.

According to the embodiments, the replication and aggregation techniques (e.g. collection tasks) may be assigned to the first distributed system 110 and the analytic calculations or a portion thereof may be assigned to the second distributed system 160. The in-memory database system 130 may be configured to perform second tasks including receiving the set of data blocks 116 from the first distributed system 110 and storing the set of data blocks 116 in the internal storage 136. For example, a communication unit 150 may be configured to handle the communication between the first distributed system 110 and the in-memory database system 130 according to the unique communication protocol. For instance, the communication unit 150 in the in-memory database system 130 operating in conjunction with the communication unit 115a in each node 115 may permit the transmission of data via the memory-to-memory copy channel. In one embodiment, after receiving the set of data blocks 116, the set of data blocks 116 may be forwarded to the sorting unit $120^1$ for sorting in the manner described above. Then, the sorting unit $120^1$ may store the sorted data blocks 116 in the internal storage 136. Alternatively, the communication unit 150 may receive the sorted data blocks 116 in the event that the first distributed system 110 sorts the data blocks 116 before transmitting them, and store the sorted data blocks 116 in the internal storage 136. However, in either case, because the data blocks 116 have been already formatted for storage in the internal storage 136, the in-memory database system 130 may directly store the set of data blocks 116 relatively quickly without the need for further processing (or relatively little processing). The internal storage 136 may include a parallel processing data store that utilizes row-based, column-based, and/or object-based storage techniques.

The second tasks may include other tasks commonly associated with the in-memory database system 130. For example, a computation unit 140 may be configured to perform in-memory computation for analytics, computations for the analytics performed by the second distributed system 160, and/or other relatively complex computations that are better suited for the in-memory database system 130.

In addition, the second tasks may include transmitting one or more stored data blocks 116 to the second distribution system 160. For example, as explained above, according to the embodiments, the second distribution system 160 may be used to performed analytics since the infrastructure associated with the second distribution system 160 (e.g., by virtue of the many different types of available packages) may be considered better suited for execution. As such, the communication unit 150 may be configured to transmit one or more stored data blocks 116 relevant to the analytic operations to the second distribution system 160 so that the second distribution system 160 may perform the analytical calculations, and the communication unit 150 may receive the results of the analytics from the second distribution system 160 and store the results in the internal storage 136.

According to one embodiment, the communication unit 150 may transmit the data blocks 116 to the second distribution system 160 via a memory-to-memory copy channel similar to the communication between the first distribution system 110 and the in-memory database system 130. For example, a communication channel (wired or wireless) may exist between the in-memory database system 130 and the second distribution system 160. As such, the communication unit 150 may perform a memory-to-memory copy from the internal storage 136 and memory units associated with the second distribution system 160 using the communication channel.

In addition, because the second distribution system 160 may utilize a scripting language different from the SQL scripting language of the in-memory database system 130, the SQL scripting language may include embedded commands associated with the language of the second distribution system 160. According to one embodiment, the scripting language associated with the second distribution system 160 may be the R language (or R script) if the second distributed system 160 includes the R system. However, the embodiments encompass any type of script, which is dependent on the type of the second distributed system 160. The in-memory database system 130 may parse the SQL scripting language to obtain the R script, and then transmit the obtained R script along with the relevant data blocks 116 to the second distribution system 160 for execution. After the second distributed system 160 performs the analytical calculations, the results of such calculations may be transmitted back to the in-memory database system 130 for storage. The transmission of information (e.g., the R script, relevant data blocks 116, and results) between the in-memory database system 130 and the second distributed system 160 may be facilitated using the memory-to-memory copy channel.

The second distributed system 160 may be configured to perform one or more third tasks including receiving one or more data blocks 116 relevant to the analytical operations (as well as the R script) and performing analytics on the received data blocks 116. The second distributed system 160 may include other third tasks, which are either known to one of ordinary skill in the art or discussed herein. The second distributed system 160 may include any type of distributed system for statistical computations including the performance of analytics. In one embodiment, the second distributed system 160 may include an open source programming language for supporting the statistical computation. Similar to the first distributed system 110, the second distributed system 160 may include a plurality of nodes 165, e.g., a node cluster. As such, the analytical operations may be distributed across the plurality of nodes 165. The plurality of nodes 165 may be computational independent computers/servers. For instance, each node 165 may represent a separate computational computer, or multiple nodes 165 may be associated with a particular computation computer. The embodiments encompass any number of nodes 165 associated with a particular computation computer including the capability of having the plurality of nodes 165 on a single computation computer. As such, each node 165 may be associated with software and hardware components such as one or more processors, and one or more non-transitory storage units including executable code, that when executed, cause the one or more processors to perform the functionalities described herein. In one particular example, the second distributed system 160 may include an R system, which is a type of system for statistical computation supporting more than 3000 available statistical packages. In this example, execution on the plurality of nodes 165 may be parallelized by a message passing interface (MPI), which is an R package.

According to the embodiments, the embedded script associated with the second distributed system 160 (e.g., the R script) along with the relevant data blocks 116 may be pushed to the second distribution system 160 for the performance of analytics. For example, the second distributed system 160 may include a job tracker 162 configured to manage the jobs received from the in-memory database system 130. The job tracker 162 may manage the job performance including assigning the third tasks to the appropriate number of nodes 165 and track the progress of each job. Also, the job tracker 162 may split the third tasks (e.g., the analytics) into a number sub-tasks, and each sub-task on each node 165 can be further parallelized and executed on multiple processors associated with the computation computers.

As indicated above, the first tasks associated with the first distributed system 110, the second tasks associated with the in-memory database system 130, and the third tasks associated with the second distributed system 160 may be controlled via the SQL script associated with the in-memory database system 130. If the in-memory database system 130 utilizes a different script other than the SQL script, controlling the first tasks, the second tasks, and the third tasks may be accomplished with the programming language of the in-memory database system 130. In other words, the federated system 100 utilizes the scripting language of the in-memory database system 130 as the main language for the federated system 100. The utilization of the programming language of the in-memory database system 130 (e.g., the SQL script) as the main language permits the integration of the first distributed system 110 and the second distributed system 110. For instance, the SQL script may invoke the first tasks associated with the first distributed system 110 such as the processing of incoming data into the set of data blocks 116, and may invoke the third tasks associated with the second distributed system 160 such as the receiving of the relevant data blocks 116 and the performing of analytics on the relevant data blocks 116.

As shown in FIG. 1A, each node 165 may include a communication unit 165a and an analytics units 165b. The communication unit 165a may be configured to handle the communication between the in-memory database system 130 and the second distributed system 160. In one example, the communication unit 165a may receive the relevant data blocks 116 from the communication unit 150 of the in-memory database system 130 as well as the embedded script associated with the second distributed system 160 via the memory-to memory copy channel. For instance, each communication unit 165a may execute a memory-to-memory copy instruction, where the transfer of the data blocks is facilitated through a communication channel, which may be any type of wired or wireless communication channel known in the art.

The analytics unit 165b may perform analytics on the relevant data blocks 116 according to the embedded script. For example, the analytic calculations may include any type of analysis that discovers patterns in data, which may rely on applications of statistics, computer programming, and/or operations research to analyze data in the context of business operations or other areas related to company performance. Also, analytic calculations may relate to the improvement and prediction of business performance. As such, according to the embodiments, the performance of analytics is assigned to the second distributed system 160, which may be the R system. Via the analytics unit 165b, the plurality of nodes 165 may perform the analytics as specified by the embedded R script, and the results of the analytics may be communicated back to the in-memory database system 130 via the memory-to-memory copy channel. The in-memory database system 130 may store the results in the internal storage 136.

Figure 1B:
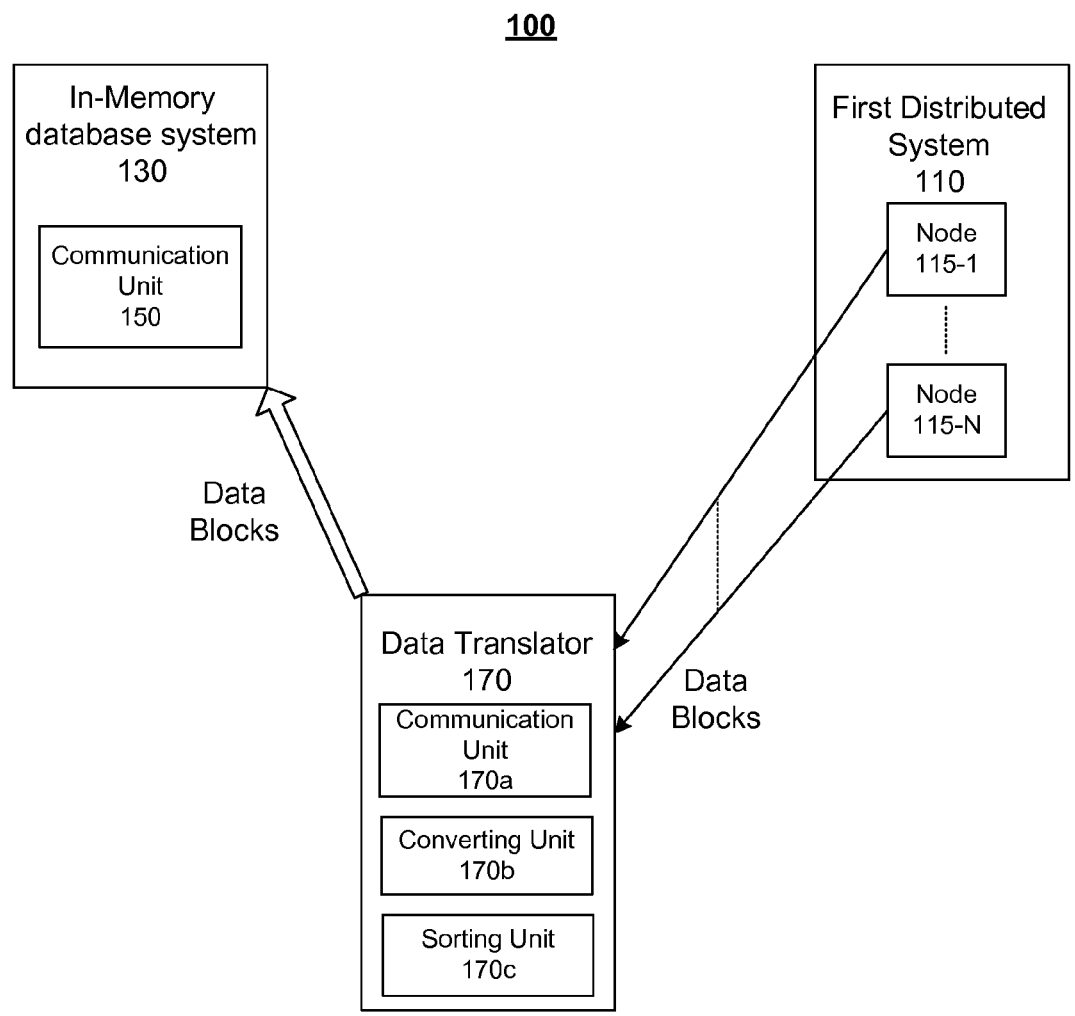
FIG. 1B illustrates the federated system including a data transmitter for supporting communication between an in-memory database system and a first distributed system of the federated system according to an embodiment.

FIG. 1B illustrates the federated system 100 including a data transmitter 170 for supporting communication between the in-memory database system 130 and the first distributed system 110 according to an embodiment. For example, instead of directly sending the set of data blocks 116 from the first distributed system 110 to the in-memory database system 130 as shown in FIG. 1A, referring to FIG. 1B, the data blocks 116 are transmitted to the in-memory database system 130 via the data transmitter 170.

In the example of FIG. 1B, the first distributed system 110 may include components similar to the components illustrated in FIG. 1A such as the plurality of nodes 115. Similar to FIG. 1A, each node 115 may process a portion of the incoming data, and formulate the processed incoming data as one or more data blocks 116. In the example of FIG. 1B, once the data is ready, each node 115 may transmit its respective data blocks 116 to the data transmitter 170 via a first communication channel, which may be any type of wired or wireless communication channel known in the art. Then, the data transmitter 170 may process the data blocks 116 such as converting the data blocks 116 to a storage format associated with the in-memory database system 130 and sorting the data blocks 116 in their appropriate order. Next, the data transmitter 170 may determine whether the data blocks 116 reaches a threshold level, and transmit the data blocks 116 to the in-memory database system 130 via a second communication channel if the data blocks 116 are determined as meeting and/or exceeding the threshold level. The second communication channel may be type of wired or wireless communication channel known in the art.

As shown in FIG. 1B, the data transmitter 170 may include a communication unit 170a, a converting unit 170b, and a sorting unit 170c. The communication unit 170a may control the communication between the first distributed system 110 and the data transmitter 170 via the first communication channel, and the data transmitter 170 and the in-memory database system 130 via the second communication channel. The converting unit 170b may be configured to convert the data blocks 116 into a format compatible with the internal storage 136 of the in-memory database system 130. For example, the data blocks 116 to be sent may be converted into the format associated with the in-memory database system 130 such that the formatted data is ready to be consumed/stored by the internal storage 136.

The sorting unit 170b may be configured to sort the set of data blocks 116 before transmitting the set of data blocks to the in-memory database system 130. In this example, the sorting unit 170b may be configured to collect each data block as it is processed by the individual node. Then, the sorting unit 170b may sort the set of data blocks 116 such that the data blocks 116 are in the appropriate order specified by the communication protocol including sorting the data blocks 116 so that they are in the correct temporal order (e.g., data block 1, data block 2, data block 3, data block 4 and data block 5, or in reverse order). Further, the sorting unit 170b may wait to transmit the set of data blocks 116 until the set reaches a threshold level. For example, the sorting unit 170b may determine whether the set of data blocks 116 reaches a threshold level (or some other criteria), and then transmit the set of data blocks 116 if the set of data blocks 116 is determined as reaching the threshold level (or meeting the specified criteria), which may be part of a larger data block.

Then, the communication unit 170a may be configured to transmit the sorted data blocks 116 to the in-memory database system 130. For example, the communication unit 150 of the in-memory database system 130 may be configured to receive the data blocks 116 via the second communication channel from the communication unit 170a of the data transmitter 170.

Figure 1C:
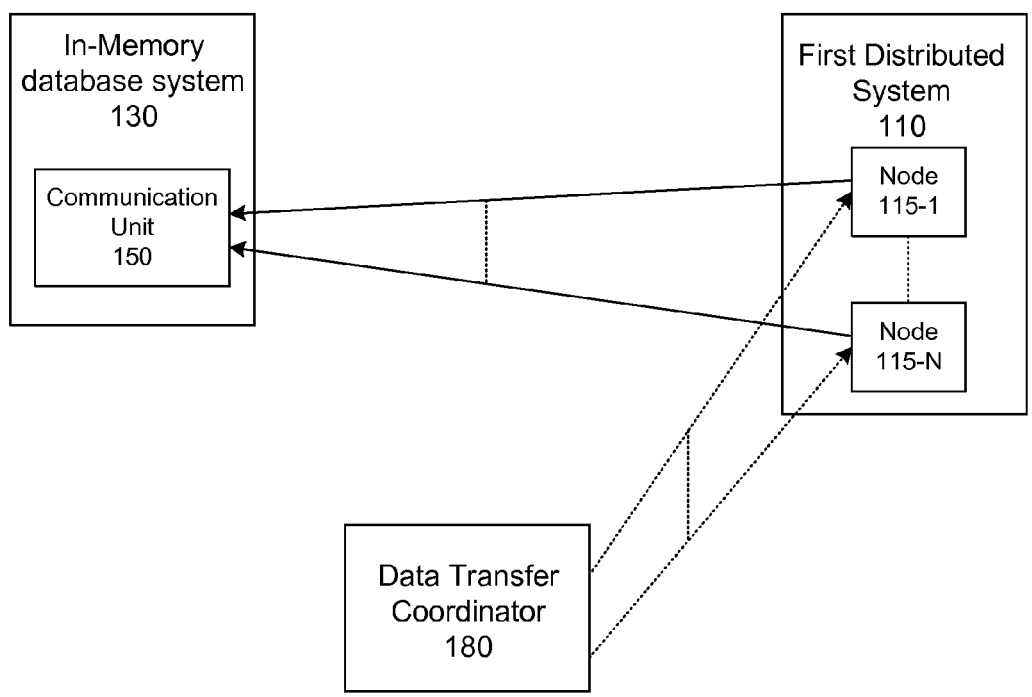
FIG. 1C illustrates the federated system including a data transfer coordinator for supporting communication between the in-memory database system and the first distributed system according to an embodiment.

FIG. 1C illustrates the federated system 100 including a data transfer coordinator 180 for supporting communication between the in-memory database system 130 and the first distributed system 110 according to an embodiment. For example, instead of directly receiving the data blocks 116, the data transfer coordinator 180 is configured to control the transmission of information via one or more control signals. For example, once the data is ready in the first distributed system 110, the data transfer coordinator 180 may control the transmission of data between the first distributed system 110 and the in-memory database system 130. The data transfer coordinator 180 may transmit one or more control signals to the relevant nodes 115, which may prompt the relevant nodes 115 to transmit their respective data blocks 116 to the in-memory database system 130 via a communication channel. In other words, the data transfer coordinator 180 may control the timing of when the respective data blocks 116 are transmitted from the nodes 115. Also, as explained above, the sorting mechanism may take place on the first distributed system 110 or the in-memory database system 130. Alternatively, the data transfer coordinator 180 may encompass a sorting mechanism that issues controls signals, which effectively sorts the data blocks 116, by controlling the timing of when the data blocks 116 from the appropriate nodes 115 are transmitted via the communication channel.

Figure 2:
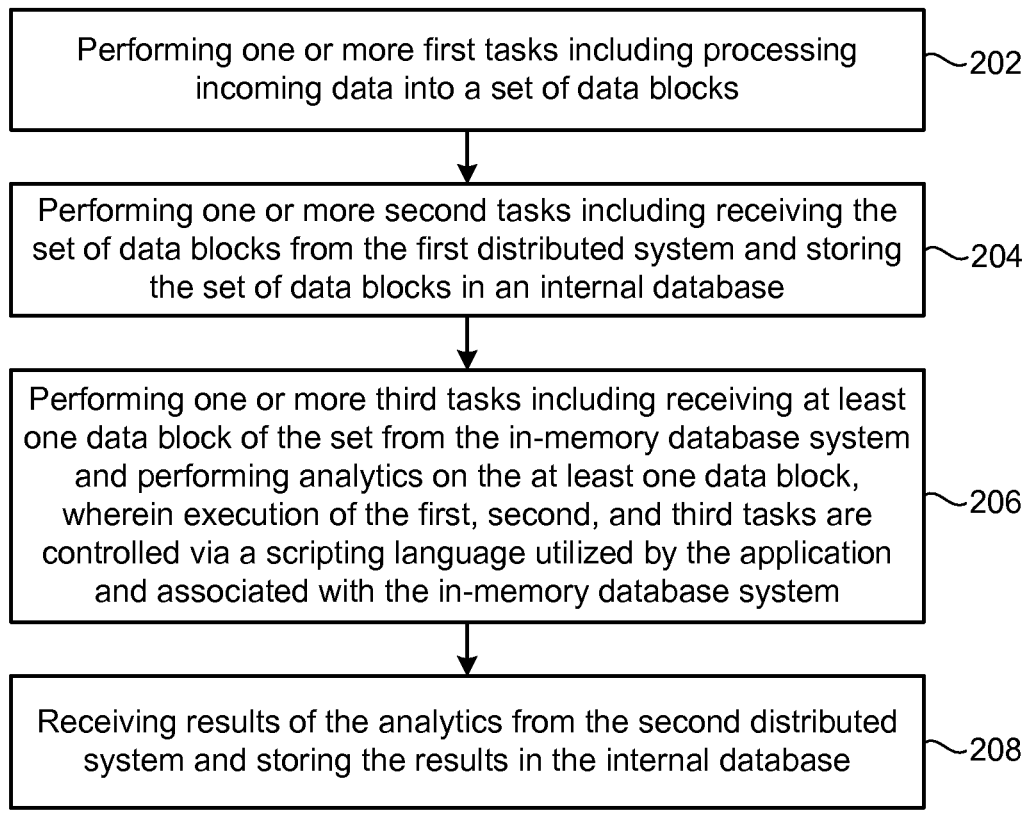
FIG. 2 is a flowchart illustrating example operations of the federated system according to an embodiment.

FIG. 2 is a flowchart illustrating example operations of the federated system 100 according to an embodiment. Although FIG. 2 is illustrated as a sequential, ordered listing of operations, it will be appreciated that some or all of the operations may occur in a different order, or in parallel, or iteratively, or may overlap in time.

One or more first tasks may be performed including processing incoming data into a set of data blocks (202). For example, the first distributed system 110 may perform one or more first tasks including processing incoming data into the set of data blocks 116. Generally, the tasks associated with the first distributed system 110 may be considered first tasks and include the functionalities of processing the data into data blocks 116, and transmitting the data blocks 116 to the in-memory database system 130 for storage and/or further processing. In one example, the first distributed system 110 may include the plurality of nodes 115, and the processing of incoming data may be implemented and distributed across the plurality of nodes 115. In particular, each node 115 may process a portion of the incoming data, and formulate the processed incoming data as one or more data blocks 116. In one specific embodiment, the first distributed system 110 may include the Hadoop system. However, generally, the first distributed system 110 may include any type of system that is distributed across a plurality of nodes that supports data collection capabilities including the collecting and processing of relatively large sets of incoming data.

In one example, as shown in FIG. 1A, each node 115 may include the communication unit 115a and the converting unit 115. The communication unit 115a may be configured to handle the communication between the first distributed system 110 and the in-memory database system 130. The transmission may be supported by a unique communication protocol for the transfer of data between these two systems. In one embodiment, each communication unit 115a may transmit its respective data blocks 116 to the in-memory database system 130 via a memory-to-memory copy channel. For example, each communication unit 115a may execute a memory-to-memory copy instruction, where the transfer of the data blocks 116 is facilitated through a communication channel. According to another embodiment, as shown in FIG. 1B, the relevant nodes 115 may transmit their respective data blocks 116 to the data transmitter 170, which may convert and sort the data blocks 116, and then transmit the sorted data blocks 116 to the in-memory database system 130. Still further, according to another embodiment, as shown in FIG. 1C, the relevant nodes 115 may transmit their respective data blocks 116 to the in-memory database system 130 based on the receipt of control signals received from the data transfer coordinator 180.

One or more second tasks may be performed including receiving the set of data blocks from the first distributed system and storing the set of data blocks in an internal database (204). For example, the in-memory database system 130 may be configured to perform one or more second tasks including receiving the set of data blocks 116 from the first distributed system 110 and storing the set of data blocks 116 in the internal storage 136. The tasks associated with the in-memory database system 130 may be considered second tasks. The in-memory database system 130 may be a type of database management system that relies on main memory for computer data storage. In one embodiment, the in-memory database system may be HANA Enterprise 1.0 (any other versions) that is developed by SAP.

As explained above, the federated system 100 may employ a sorting mechanism, which may be associated with the first tasks (e.g., the first distributed system 110), or the second tasks (e.g., the in-memory database system 130). For example, as shown in FIG. 1A, the first distributed system 110 may include the sorting unit 120 that is configured to sort the set of data blocks 116 before transmitting the set of data blocks to the in-memory database system 130. In particular, the sorting unit 120 may determine whether the set of data blocks 116 reaches a threshold level (or some other criteria), and then transmit the set of data blocks 116 if the set of data blocks 116 is determined as reaching the threshold level (or meeting the specified criteria), which may be part of a larger data block.

In another example, the sorting mechanism may be accomplished at the in-memory database system 130. In this example, the in-memory data system 130 may include the sorting unit $120^1$ that is configured to sort the set of data blocks 116. In particular, instead of sorting the data blocks 116 at the first distributed system 110, relevant nodes 115 transmit their data blocks 116 to the in-memory database system 130 as they are formed. For example, each node 115 may transmit a data block 116 once it is generated, and the sorting unit $120^1$ in the in-memory database system 130 is responsible for sorting the data blocks 116. The data blocks 116 are not made available until the sort function is carried out, e.g., when previous data blocks 116 are received.

As explained above, a communication unit 150 of the in-memory database system 130 may be configured to handle the communication between the first distributed system 110 and the in-memory database system 130 according to the unique communication protocol. For instance, the communication unit 150 in the in-memory database system 130 operating in conjunction with the communication unit 115a in each node 115 may permit the transmission of data via the memory-to-memory copy channel. In one embodiment, after receiving the set of data blocks 116, the set of data blocks 116 may be forwarded to the sorting unit $120^1$ for sorting in the manner described above. Then, the sorting unit $120^1$ may store the sorted data blocks 116 in the internal storage 136. Alternatively, the communication unit 150 may receive the sorted data blocks 116 in the event that the first distributed system 110 sorts the data blocks 116 before transmitting them, and store the sorted data blocks 116 in the internal storage 136. However, in either case, because the data blocks 116 have been already formatted for storage in the internal storage 136, the in-memory database system 130 may directly store the set of data blocks 116 relatively quickly without the need for further processing (or relatively little processing). In addition, the in-memory database system 130 may receive the data blocks 116 via the alternative mechanisms illustrated in FIGS. 1B and 1C.

One or more third tasks may be performed including receiving at least one data block of the set from the in-memory database system and performing analytics on the at least one data block, wherein execution of the first, second, and third tasks are controlled via a scripting language utilized by the application and associated with the in-memory database system (206). For example, the second distributed system 160 may be configured to perform one or more third tasks including receiving one or more data blocks 116 relevant to the analytical operation and performing analytics on the received data blocks 116. The tasks performed by the second distributed system 160 may be considered third tasks.

The second distributed system 160 may include any type of distributed system for statistical computations including the performance of analytics. In one embodiment, the second distributed system 160 may include an open source programming language for supporting the statistical computation. Similar to the first distributed system 110, the second distributed system 160 may include the plurality of nodes 165. As such, the analytical operations may be distributed across the plurality of nodes 165. In one particular example, the second distributed system 160 may include an R system, which is a type of system for statistical computation supporting more than 3000 available statistical packages. In this example, execution on the plurality of nodes 165 may be parallelized by message passing interface (MPI), which is an R package.

According to the embodiments, the embedded script associated with the second distributed system 160 (e.g., the R script) along with the relevant data blocks 116 may be pushed to the second distribution system 160 for the performance of analytics. As indicated above, the first tasks associated with the first distributed system 110, the second tasks associated with the in-memory database system 130, and the third tasks associated with the second distributed system 160 may be controlled via the scripting language (e.g., SQL script) associated with the in-memory database system 130. If the in-memory database system 130 utilizes a different script other than the SQL script, controlling the first tasks, the second tasks, and the third tasks may be accomplished with the programming language of the in-memory database system 130. In other words, the federated system 100 utilizes the scripting language of the in-memory database system 130 as the main language for the federated system 100. The utilization of the programming language of the in-memory database system 130 (e.g., the SQL script) as the main language permits the integration of the first distributed system 110 and the second distributed system 110. For instance, the SQL script may invoke the first tasks associated with the first distributed system 110 such as the processing of incoming data into the set of data blocks 116, and may invoke the third tasks associated with the second distributed system 160 such as the receiving of the relevant data blocks 116 and the performing of analytics on the relevant data blocks 116.

Each node 165 of the second distributed system 160 may include the communication unit 165a and the analytics units 165b. The communication unit 165a may be configured to handle the communication between the in-memory database system 130 and the second distributed system 160 according to the unique protocol for supporting the transfer of data between these two systems. In one example, the communication unit 165a may receive the relevant data blocks 116 from the communication unit 150 of the in-memory database system 130 as well as the embedded script associated with the second distributed system 160 via the memory-to memory copy channel. For instance, each communication unit 165a may execute a memory-to-memory copy instruction, where the transfer of the data blocks is facilitated through a communication channel, which may be any type of wired or wireless communication channel known in the art.

The analytics unit 165b may perform analytics on the relevant data blocks 116 according to the embedded script. For example, analytic calculations may include any type of analysis that discovers patterns in data, which may rely on applications of statistics, computer programming, and/or operations research to analyze data in the context of business operations or other areas related to company performance. Also, analytic calculations may relate to the improvement and prediction of business performance. As such, according to the embodiments, the performance of analytics is assigned to the second distributed system 160, which may be the R system.

Results of the analytics may be received from the second distributed system and the results may be stored in the internal database (208). For example, the in-memory database system 130 may receive the results of the analytics from the second distributed system 160 and store the results in the internal storage 136. In particular, via the analytics unit 165b, the plurality of nodes 165 may perform the analytics as specified by the embedded R script, and the results of the analytics may be communicated back to the in-memory database system 130 via the memory-to-memory copy channel. The in-memory database system 130 may store the results in the internal storage 136.

FIGS. 3-7 illustrate code implementations of the federated system 100 according to an embodiment.

FIGS. 3A-B illustrate a code implementation of a new map task performed by the first distributed system 110 related to the collection and processing of incoming data. The main portions of the code implementation of FIGS. 3A and 3B are further explained below.

Referring to FIG. 3A, portion 310 relates to a memory map task, which may be a new custom map task. Portion 315 provides a number of initial steps such as the creating of the task context, a mapper object, and the generating of the input format by a job configuration. Portion 320 includes instructions for obtaining the input split for the memory map task. If the first distributed system 110 includes the Hadoop system, the input split is a logical split of the inputs, where the input files are not physical split. The data split may include metadata information such as the order number of the split in the file. Referring to FIG. 3B, portion 325 includes instructions to create the output object (e.g., the MapMemoryOutputCollector) as the result collector, which may replace the original RecordWriter in order to directly send the results to the local daemon. Portion 330 may initialize the context for the mapper, and execute the memory map task. In this example, the map function provided by the user would be called in the run function. At last, the output would be closed so that all the results are serialized to the local result collector daemon.

FIG. 4 relates to a MapMemoryOutputCollector, which may be used by the new map task to store the output in memory and send the results of one map task to the local daemon when the close method is called according to an embodiment. Portion 405 includes class field declaration and a constructor in order to perform initial process steps. It is noted that that the argument of split index in the constructor is passed to indicate where the result data should be put in the final output file. Portion 410 includes a write method that is called in the map function to store each result in the memory buffer of the class. Portion 415 includes a flush method, which is used to serialize the result buffer to a local result collect daemon before closing the collector. The buffer may store the slip index (e.g., the order number) in the second field. Portion 420 includes a close method, which may flush the buffer before closing the local socket.

FIGS. 5A-D relate to a result collect daemon to transfer data from the map task to the in-memory database system 130 according to an embodiment. For example, each node 115 includes a particular daemon to receive data from all map tasks running in the respective node 115.

Referring to FIG. 5A, portion 505 includes declarations and an initial set-up method. Portion 510 includes a singleton method to obtain a unique daemon object. Referring to FIG. 5B, portion 515 includes a get Data method, which obtains data asynchronously from the buffer and transmits the data to a next stop daemon in the data flow hierarchy. Portion 520 includes a put Data method, which sends the data from the daemon buffer to a remote daemon, or directly to the in-memory database system 130 according to the configuration. Portion 525 includes instructions to start the daemon, which would listen on the specified sock port to accept the incoming connection and data. Referring to FIG. 5C, portion 530 includes a main method, which is the entry to run the daemon. Referring to FIGS. 5C and 5D, portion 535 includes a Data Receiver class, which may implement the runnable method responsible to receive the data and save the data into a data buffer. Referring to FIG. 5D, portion 540 includes a Data Sender class, which may also implement the runnable method responsible to send the data to a next daemon or directly to the in-memory database system 130 according to the configuration.

FIG. 6 illustrates instructions in the in-memory database system 130 to store the received data blocks 116 into the internal storage 136 according to an embodiment. Portion 605 includes instructions to receive the data blocks 116 from the first distribution system 110, and save the data blocks 116 in a data buffer of the internal storage 136. Portion 610 includes instructions to obtain the columns of the internal storage 136 in order to consume the data blocks 116 in the buffer. Portion 615 includes instructions to read the data blocks 116 from the buffer and store them sequentially in the columns of the internal storage 136.

FIG. 7 illustrates sample SQL script code on how to issue a federated query in the in-memory database system 130 according to an embodiment. Portion 705 includes instructions to create the table type to hold the result schema from first distributed system 110. Portion 710 includes instructions to create one procedure to call the related driver function. Portion 715 includes instructed to create the table to store the final results. Portion 720 includes instructions to call the procedure with overview of the results.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A federated system for supporting an application to perform analytics, the federated system comprising:
 a first distributed system for performing one or more first tasks including processing incoming data into a set of data blocks;
 an in-memory database system for performing one or more second tasks including receiving the set of data blocks from the first distributed system and storing the set of data blocks in an internal storage; and a second distributed system for performing one or more third tasks including receiving at least one data block of the set of data blocks stored in the internal storage of the in-memory database system and performing analytical calculations on the at least one data block, wherein execution of the first, second, and third tasks on the first distributed system, the in-memory database system, and the second distributed system are controlled via executable instructions of a scripting language utilized by the application, the scripting language being a main language of the in-memory database system, wherein the one or more second tasks includes receiving results of the analytical calculations from the second distributed system and storing the results in the internal storage of the in-memory database system, wherein the in-memory database system is configured to parse the executable instructions to obtain script associated with the second distributed system, the script associated with the second distributed system having been embedded within the executable instructions, the in-memory database system configured to transmit the script associated with the second distributed system to the second distribution system for performing the analytical calculations.

2. The federated system of claim 1, wherein the first distributed system includes a Hadoop system, and the second distributed system includes an R system.

3. The federated system of claim 1, wherein the executable instructions includes a Structured Query Language (SQL) script, the SQL script being the main scripting language of the in-memory database system, the SQL script having embedded script, the embedded script being in a scripting language of the second distributed system, the main scripting language of the in-memory database system being different than the scripting language of the second distributed system.

4. The federated system of claim 1, wherein the in-memory database system is configured to receive the set of data blocks from the first distributed system via a memory-to-memory copy channel between the first distributed system and the in-memory database system.

5. The federated system of claim 1, wherein the set of data blocks includes a first data block and a second data block, and the first distributed system includes a plurality of computers distributed across a plurality of nodes, the plurality of computers including a first computer and a second computer, the first computer configured to process a first portion of the incoming data into the first data block, the second computer configured to process a second portion of the incoming data into the second data block, wherein the first data block and the second data block are transmitted to the in-memory database system.

6. The federated system of claim 5, wherein the in-memory database system is configured to receive the first data block and the second data block, and the in-memory database system includes a sorting unit configured to sort the first data block and the second data block in temporal order.

7. The federated system of claim 5, wherein the first distribution system includes a sorting unit configured to sort the first data block and the second data block in temporal order, wherein the sorted first and second data blocks are transmitted to the in-memory database system.

8. The federated system of claim 1, wherein the second distributed system receives the at least one data block from the in-memory database system in conjunction with the script associated with the second distributed system.

9. The federated system of claim 1, wherein the in-memory database system receives the results of the analytical calculations via a memory-to-memory copy channel between the in-memory database system and the second distributed system.

10. The federated system of claim 1, further comprising:

a data transmitter configured to support communication between the in-memory database system and the first distributed system such that the set of data blocks are routed through the data transmitter, the data transmitter configured to receive the set of data blocks from the first distributed system, determine whether the set of data blocks reaches a threshold level, and transmit the set of data blocks to the in-memory database system if the set of data blocks is determined as reaching the threshold level.

11. The federated system of claim 5, further comprising:

a data transfer coordinator configured to control transfer of the set of data blocks from the first distributed system to the in-memory database system, the data transfer coordinator configured to transmit control signals to the first computer and the second computer, the control signals indicating to start transfer of the first data block and the second data block to the in-memory database system.

12. A method for supporting an application to perform analytics, the method comprising:

performing, by a first distributed system, one or more first tasks including processing incoming data into a set of data blocks;

performing, by an in-memory database system, one or more second tasks including receiving the set of data blocks from the first distributed system and storing the set of data blocks in an internal storage; and performing, by a second distributed system, one or more third tasks including receiving at least one data block of the set of data blocks stored in the internal storage of the in-memory database system and performing analytical calculations on the at least one data block, wherein execution of the first, second, and third tasks on the first distributed system, the in-memory database system, and the second distributed system are controlled via executable instructions of a scripting language, the scripting language being a main language of the in-memory database system, wherein the one or more second tasks includes receiving results of the analytical calculations from the second distributed system and storing the results in the internal storage of the in-memory database system, wherein the one or more second tasks include parsing the executable instructions to obtain script associated with the second distributed system and transmitting the obtained script to the second distributed system.

13. The method of claim 12, wherein the receiving the set of data blocks from the first distributed system includes receiving the set of data blocks from the first distributed system via a memory-to-memory copy channel.

14. The method of claim 12, wherein the one or more first tasks further includes converting the incoming data into the set of data blocks with a format compatible with the internal storage of the in-memory database system.

15. The method of claim 12, wherein the one or more second tasks includes sorting the set of data blocks in temporal order, the at least one data block not being sent to the second distributed system until other data blocks of the set are processed by the in-memory database system.

16. The method of claim 12, wherein the one or more first tasks includes sorting the set of data blocks in temporal order before transmitting the set of data blocks to the in-memory database system.

17. The method of claim 12, wherein the one or more third tasks includes receiving the script associated with the second distributed system and the at least one data block via a memory-to-memory copy channel between the in-memory database system and the second distributed system.

18. A computer program product tangibly embodied on a non-transitory computer-readable storage medium and including executable code that, when executed, is configured to cause a federated system to:

distribute tasks among a first distributed system, an in-memory database system, and a second distributed system including assigning first tasks to the first distributed system, assigning second tasks to the in-memory database system, and assigning third tasks to the second distributed system;

perform, by the first distributed system, the first tasks including processing incoming data into a set of data blocks;

perform, by the in-memory database system, the second tasks including receiving the set of data blocks from the first distributed system and storing the set of data blocks in an internal storage of the in-memory database system; and perform, by the second distributed system, the third tasks including receiving at least one data block of the set of data blocks stored in the internal storage of the in-memory database system and performing analytical calculations on the at least one data block, wherein execution of the first, second, and third tasks are controlled via executable instructions of a scripting language associated with the in-memory database system, the scripting language being a main language of the in-memory database system, wherein the one or more second tasks includes receiving results of the analytical calculations from the second distributed system and storing the results in the internal storage of the in-memory database system, wherein the in-memory database system is configured to parse the executable instructions to obtain script associated with the second distributed system, the script associated with the second distributed system having been embedded within the executable instructions, the in-memory database system configured to transmit the script associated with the second distributed system to the second distribution system for performing the analytical calculations.

\* \* \* \* \*